July 10, 1934. F. A. DORRIS 1,966,028
GATE
Filed July 19, 1933 3 Sheets-Sheet 1
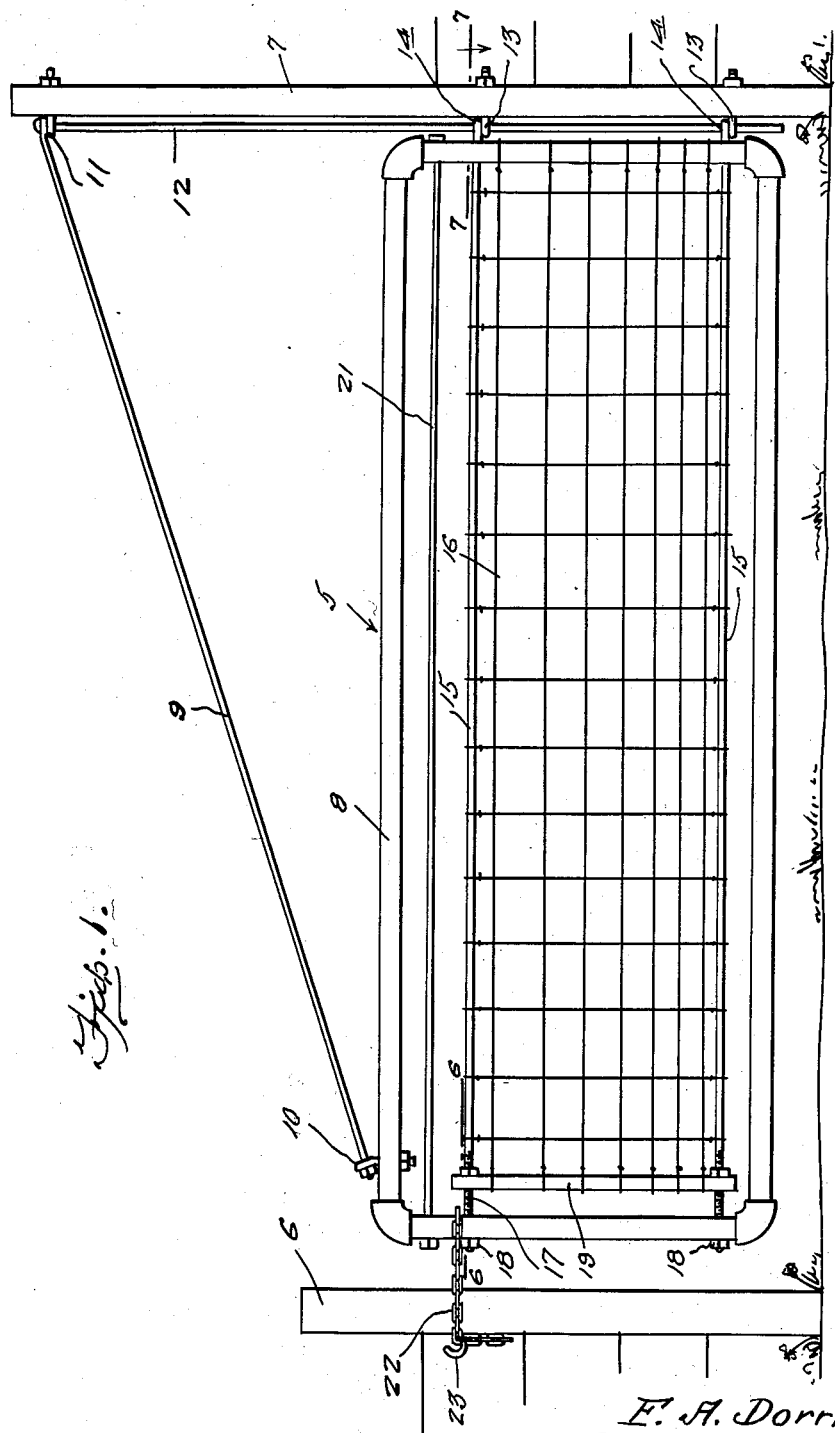
Inventor
F. A. Dorris
By Clarence A. O'Brien
Attorney

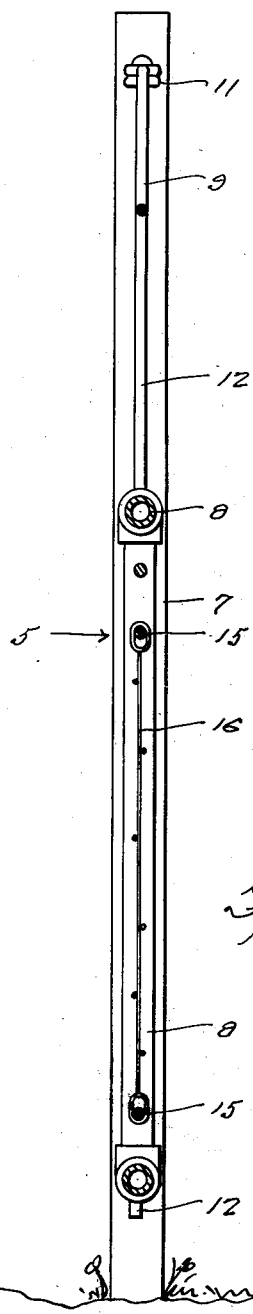
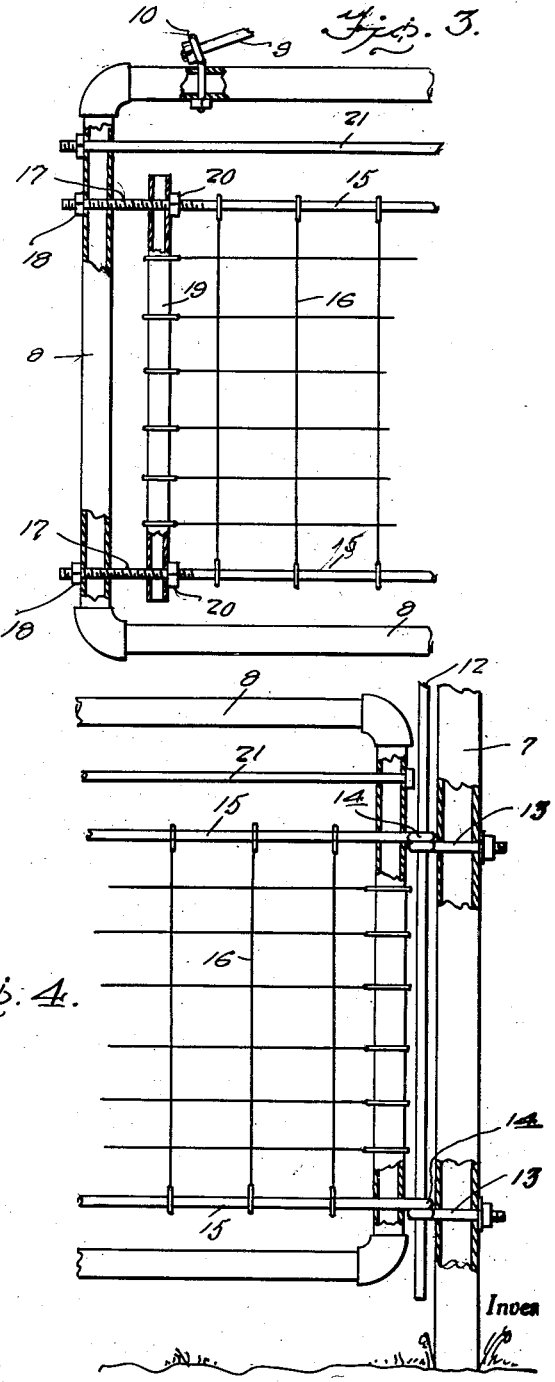

July 10, 1934.   F. A. DORRIS   1,966,028
GATE
Filed July 19, 1933    3 Sheets-Sheet 3
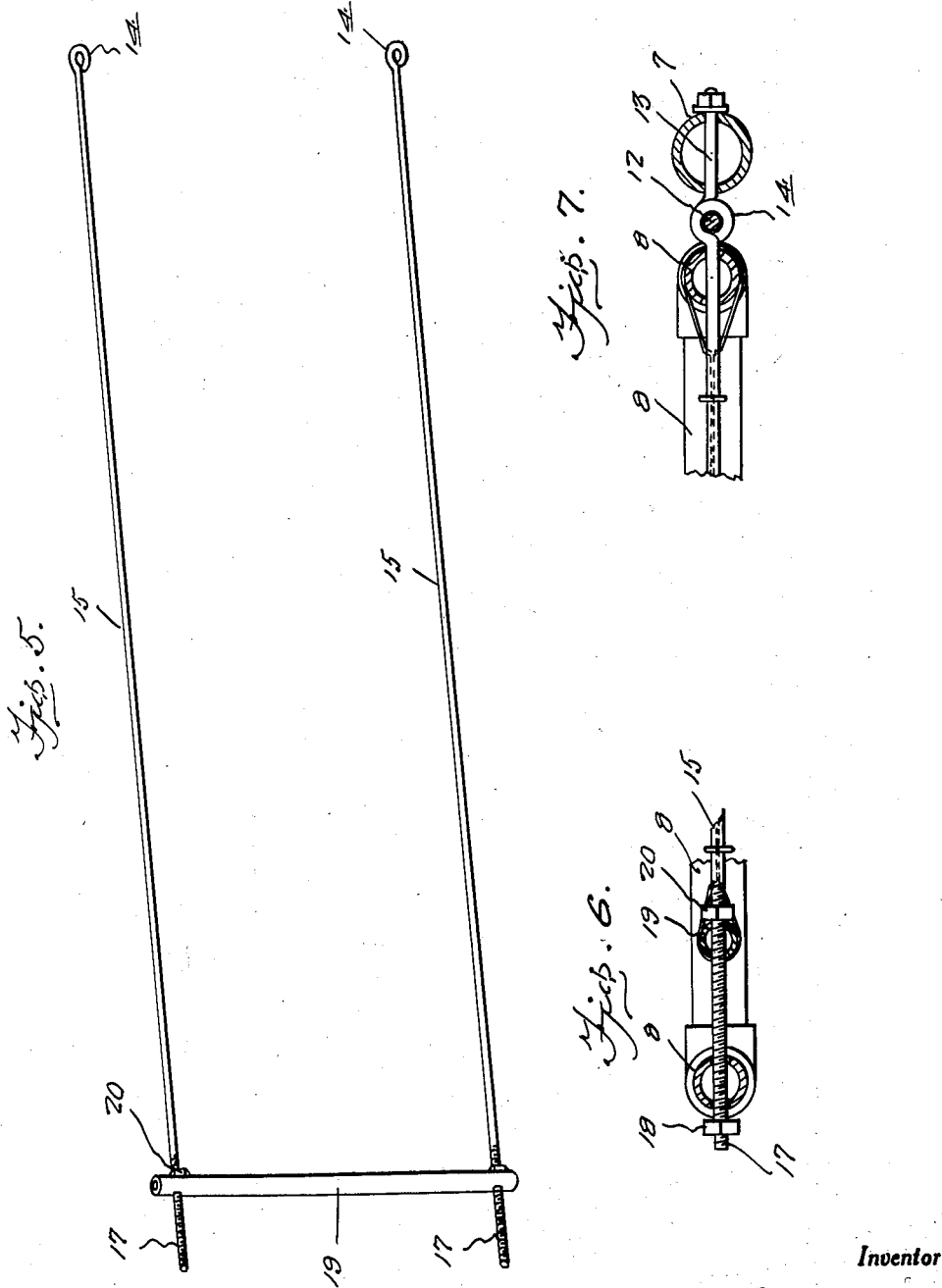
Inventor
F. A. Dorris
By Clarence A. O'Brien
Attorney Patented July 10, 1934

1,966,028

UNITED STATES PATENT OFFICE 1,966,028

GATE

Frank A. Dorris, Olpe, Kans.

Application July 19, 1933, Serial No. 681,184

3 Claims. (Cl. 39—74)

This invention appertains to new and useful improvements in wire fence gates, and more particularly to a gate of the wire fabricated filled in type.

The principal object of the present invention is to provide a wire mesh filled in gate wherein tightening means is provided for maintaining the wire filler always taut.

Other important objects and advantages of the invention will become apparent to the reader of the following specification.

In the drawings:—

Figure 1 represents a side elevational view of the novel gate.

Figure 2 represents a vertical sectional view through the gate.

Figure 3 represents a fragmentary side elevational view of the gate at the fastened end thereof, with parts broken away to disclose details.

Figure 4 represents a fragmentary side elevational view of the gate at the hinged end thereof, with parts broken away to disclose details.

Figure 5 represents a perspective view of the tightening frame for the wire mesh.

Figure 6 represents a fragmentary detailed sectional view taken substantially on line 6—6 of Figure 1.

Figure 7 represents a fragmentary detailed sectional view taken substantially on line 7—7 of Figure 1.

Referring to the drawings wherein like numerals designate like parts, it can be seen in Figure 1 that numeral 5 generally refers to the novel gate structure situated between the fence posts 6—7.

The gate 5 includes a rectangular shaped frame 8 and a brace rod 9 extends from the anchor 10 at the free end of the gate to a bracket 11 at the upper end of the post 7. The upper end of the brace 9 is, of course, pivotally connected to the bracket 11 preferably by having the hinge rod 12 extend upwardly therethrough, while the lower portion of the hinge rod 12 extends through the eye bolts 13—13 on the post 7 and also through the eyes 14—14 at the hinged ends of the wire tightening bars 15—15, which bars form part of a frame for tightening the wire mesh 16, which frame is shown in Figure 5. These bars 15 extend through the hinged end of the gate frame 8, as shown in Figure 4, and at their remaining ends are threaded, as at 17. These threaded portions are disposed through the free end of the gate and at these points equipped with nuts 18 to prevent displacement. Slidable on the threaded portions of the bars 15—15 is the cross bar 19 to which one end of the wire mesh strip 16 is secured, while the opposite end of this strip is secured to the hinged end of the gate frame 8, as clearly shown in Figures 1 and 4. On each of the rods 15—15 at the threaded portion thereof and at the inner side of the cross bar 19 is a nut 20 which, when fed outwardly, moves the cross bar 19 toward the free end of the gate and in so doing tightens the mesh filler 16. A supplemental brace rod 21 is interposed between the ends of the gate adjacent the upper bar thereof.

A chain loop 22 may be employed in conjunction with a hook 23 on the post 6 for securing the gate in closed position.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A gate structure comprising a rectangular shaped frame, a wire mesh filler for the frame, said filler being attached at one end to one end of the frame, the other end of the filler being provided with a cross bar, a rod extending longitudinally of the frame and through an opening in the said bar, and means on the said rod adjustable against the filler side of the bar for urging the said bar toward the adjacent end of the frame and maintaining the said filler taut.

2. A swingable gate comprising a rectangular shaped frame, a wire mesh filler for the frame, said filler being attached at one end to one end of the gate frame, and adjustable means between the opposite end of the filler and the free end of the gate frame, said means including a pair of bars extending between the ends of the frame and on which the filler is shiftable from its secured end toward its opposite end, and an adjustable cross bar on the said first mentioned bars to which the last mentioned end of the filler is attached.

3. A swingable gate comprising a rectangular shaped frame, a wire mesh filler for the frame, said filler being attached at one end to one end of the gate frame, adjustable means between the opposite end of the filler and the free end of the gate frame, said means including a pair of bars extending between the ends of the frame and on which the filler is shiftable from its secured end toward its opposite end, and an adjustable cross bar on the said first mentioned bars to which the last mentioned ends of the filler is attached, said first mentioned bars being provided with threads, and nuts on the threaded portions of the said bars feedable against the bar to which the filler is attached to urge the said filler attached bar toward the adjacent end of the gate frame.

FRANK A. DORRIS.